(12) United States Patent
Wang et al.

(10) Patent No.: US 12,362,943 B2
(45) Date of Patent: Jul. 15, 2025

(54) DYNAMIC ORCHESTRATION-BASED AUDIO-VIDEO SECURITY PROTECTION METHOD, DEVICE AND SYSTEM

(71) Applicant: Hangzhou Hikvision Digital Technology Co., Ltd., Zhejiang (CN)

(72) Inventors: Bin Wang, Hangzhou (CN); Da Chen, Hangzhou (CN); Yuyin Wang, Hangzhou (CN); Jiadong Chen, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/985,870

(22) Filed: Dec. 18, 2024

(65) Prior Publication Data

US 2025/0211449 A1 Jun. 26, 2025

(30) Foreign Application Priority Data

Dec. 22, 2023 (CN) .......................... 202311786557.8

(51) Int. Cl.
*H04L 9/32* (2006.01)
*G06F 21/16* (2013.01)
(Continued)

(52) U.S. Cl.
CPC ............ *H04L 9/3242* (2013.01); *G06F 21/16* (2013.01); *H04L 9/0869* (2013.01); *H04L 9/14* (2013.01); *H04L 9/3234* (2013.01)

(58) Field of Classification Search
None
See application file for complete search history.

(56) References Cited

U.S. PATENT DOCUMENTS 9,037,867 B2 * 5/2015 Ueda ...................... G06F 21/50
713/180
9,325,502 B2 * 4/2016 Piepenbrink .......... H04L 9/3263
(Continued)

FOREIGN PATENT DOCUMENTS

CN          1571331 A    *  1/2005
CN        101578842 A    * 11/2009    ............. H04L 29/06
(Continued)

OTHER PUBLICATIONS

Sascha Zmudzinski; (Digital Watermarking for Verification of Perception-based Integrity of audio Data); pp. 246; Published in (Year: 2017).*
(Continued)

*Primary Examiner* — Ali H. Cheema
(74) *Attorney, Agent, or Firm* — Fish & Richardson P.C.

(57) ABSTRACT

A dynamic orchestration-based audio-video security protection method is provided. A security sharing gateway identifies a level of audio-video data in an audio-video code stream and an authority of an audio-video retrieval platform before forwarding the audio-video code stream to the audio-video retrieval platform. In a case where the security sharing gateway does not retrieve a platform authority corresponding to the level of the audio-video data, it reports alarm information to a network and data security situation awareness platform. The network and data security situation awareness platform issues a platform authority corresponding to the level of the audio-video data to the security sharing gateway according to the alarm information, and in a case where it is determined that the level of the audio-video data does not match the authority of the audio-video retrieval platform, dynamically adjusts a security protection strategy of at least one other gateway in the system.

13 Claims, 3 Drawing Sheets

---

Before forwarding an audio-video code stream to an audio-video retrieval platform, the security sharing gateway identifies a level of audio-video data in the audio-video code stream and the audio-video retrieval platform's authority — S100

In the case where the security sharing gateway does not retrieve a platform permission corresponding to the level of the audio-video data, the security sharing gateway reports alarm information to the network and data security situation awareness platform, wherein the alarm information includes the level of the audio-video data and the audio-video retrieval platform's authority. The network and data security situation awareness platform issues a platform authority corresponding to the level of the audio-video data to the security sharing gateway according to the alarm information, and in the case where it is determined that the level of the audio-video data does not match the authority of the audio-video retrieval platform, the network and data security situation awareness platform dynamically adjusts the security protection strategy of at least one other gateway in the dynamic orchestration audio-video security protection system; wherein the security of the adjusted security protection strategy is higher than the security of the security protection strategy before adjustment — S110

(51) Int. Cl.
*H04L 9/08* (2006.01)
*H04L 9/14* (2006.01)

(56) References Cited

U.S. PATENT DOCUMENTS

| | | | |
|---|---|---|---|
| 11,100,197 B1 | 8/2021 | Bernardi | |
| 2007/0053662 A1* | 3/2007 | Tobita | G11B 20/0021 386/258 |
| 2008/0044017 A1* | 2/2008 | Nakano | G11B 20/00347 380/201 |
| 2008/0098212 A1 | 4/2008 | Helms et al. | |
| 2011/0055585 A1* | 3/2011 | Lee | H04L 9/3226 713/183 |
| 2011/0145560 A1 | 6/2011 | Moon et al. | |
| 2011/0255690 A1* | 10/2011 | Kocher | H04L 9/3249 380/210 |
| 2016/0248593 A1 | 8/2016 | Roth et al. | |
| 2017/0222968 A1* | 8/2017 | Li | H04W 4/12 |
| 2017/0351775 A1* | 12/2017 | Rui | G06F 9/451 |
| 2018/0332347 A1* | 11/2018 | Hamiti | G06F 16/435 |
| 2022/0078210 A1 | 3/2022 | Crabtree et al. | |
| 2022/0224723 A1 | 7/2022 | Crabtree et al. | |

FOREIGN PATENT DOCUMENTS

| | | | | |
|---|---|---|---|---|
| CN | 101729574 A | * | 6/2010 | |
| CN | 103455698 A | | 12/2013 | |
| CN | 103595956 A | | 2/2014 | |
| CN | 106921791 A | * | 7/2017 | G06F 21/6218 |
| CN | 112364305 A | * | 2/2021 | G06F 16/27 |
| CN | 109600620 B | * | 3/2021 | H04N 19/467 |
| CN | 112954403 A | | 6/2021 | |
| CN | 113411295 A | | 9/2021 | |
| CN | 113660222 A | | 11/2021 | |
| CN | 113706344 A | * | 11/2021 | G06F 21/602 |
| CN | 114205563 A | | 3/2022 | |
| CN | 115208689 A | | 10/2022 | |
| CN | 115272040 A | * | 11/2022 | |
| CN | 116527314 A | | 8/2023 | |
| KR | 102542720 B1 | | 6/2023 | |
| RU | 2258315 C1 | * | 8/2005 | |
| WO | WO-2023236617 A1 | * | 12/2003 | G06F 21/16 |
| WO | WO 2021072878 A1 | | 4/2021 | |
| WO | WO 2021087956 A1 | | 5/2021 | |

OTHER PUBLICATIONS

Jing et al., "Application of SVAC2.0 in Video Security System," China Security Protection, Oct. 2017, 10 pages (with English machine translation).

Lin, "Practice of secure transmission of media files between subnets," New Media Research, 2015, 4 pages (with English machine translation).

Notice of Allowance in Chinese Appln. No. 202311786557.8, mailed on Feb. 5, 2024, 12 pages (with partial English machine translation).

Zhang et al., "Research on Information Security Mechanism Used in Network Video Surveillance System" Telecommunications Science, No. 8, 5 pages (with English abstract).

* cited by examiner

| S100 | Before forwarding an audio-video code stream to an audio-video retrieval platform, the security sharing gateway identifies a level of audio-video data in the audio-video code stream and the audio-video retrieval platform's authority |

| S110 | In the case where the security sharing gateway does not retrieve a platform permission corresponding to the level of the audio-video data, the security sharing gateway reports alarm information to the network and data security situation awareness platform, wherein the alarm information includes the level of the audio-video data and the audio-video retrieval platform's authority. The network and data security situation awareness platform issues a platform authority corresponding to the level of the audio-video data to the security sharing gateway according to the alarm information, and in the case where it is determined that the level of the audio-video data does not match the authority of the audio-video retrieval platform, the network and data security situation awareness platform dynamically adjusts the security protection strategy of at least one other gateway in the dynamic orchestration audio-video security protection system; wherein the security of the adjusted security protection strategy is higher than the security of the security protection strategy before adjustment |

FIG. 1

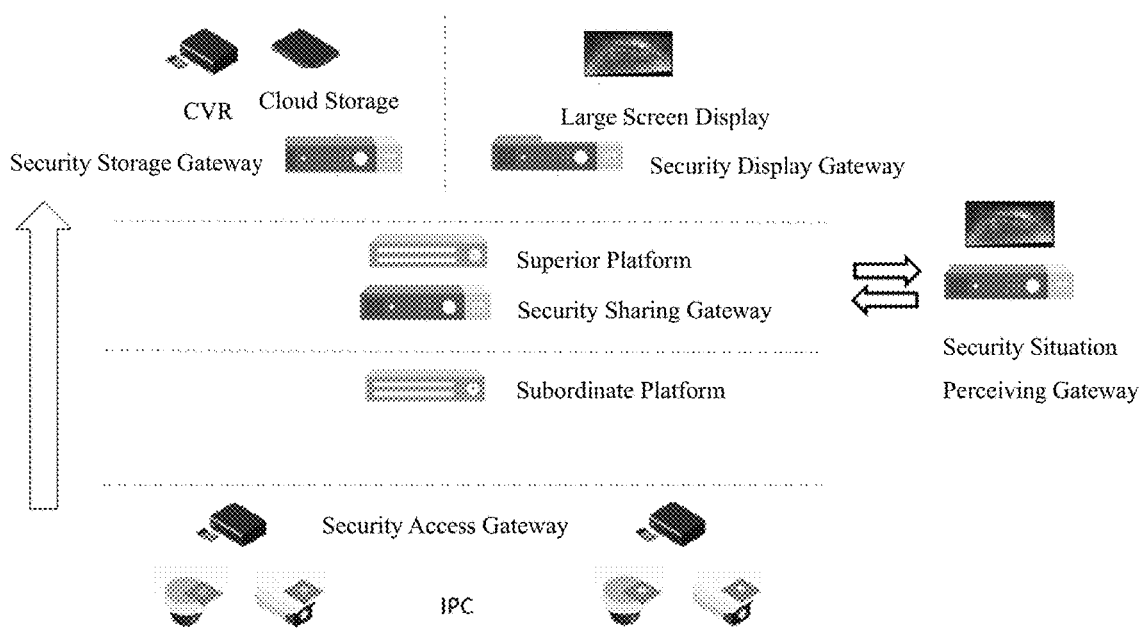

FIG. 2

DYNAMIC ORCHESTRATION-BASED AUDIO-VIDEO SECURITY PROTECTION METHOD, DEVICE AND SYSTEM

CROSS REFERENCE TO RELATED APPLICATIONS

This application claims priority to Chinese Patent Application No. 202311786557.8, filed on Dec. 22, 2023, the disclosure of which is incorporated herein by reference in its entirety for all purposes.

TECHNICAL FIELD

The present application relates to the field of data security, and more particularly to a dynamic orchestration-based audio-video security protection method, apparatus and system.

BACKGROUND

Audio-video data mainly includes video, audio and picture data collected by network cameras in public areas such as cities, traffic and buildings as well as private areas.

Audio-video data may face security issues such as data leakage, including but not limited to monitoring data being stolen, being maliciously tampered and forwarded, etc., during the process of generation, transmission, data sharing between superior and subordinate platforms, storage, etc. Ensuring the security of audio-video data is important to protect the privacy of users, maintain trade secrets, and prevent information leakage.

SUMMARY

In view of this, the present application provides a dynamic orchestration-based audio-video security protection method, apparatus and system.

In some examples, the present application is implemented by the following technical solution.

According to a first aspect of an embodiment of the present application, a dynamic orchestration-based audio-video security protection method is provided, wherein a dynamic orchestration-based audio-video security protection system comprises a security sharing gateway and a network and data security situation awareness platform, and the method comprises:
  identifying, by the security sharing gateway, a level of audio-video data in an audio-video code stream and an authority of an audio-video retrieval platform before forwarding an audio-video code stream to an audio-video retrieval platform;
  in a case where the security sharing gateway retrieves no platform authority corresponding to the level of the audio-video data, reporting, by the security sharing gateway, alarm information to the network and data security situation awareness platform, wherein the alarm information comprises the level of the audio-video data and the authority of the audio-video retrieval platform, so that the network and data security situation awareness platform issues a platform authority corresponding to the level of the audio-video data to the security sharing gateway according to the alarm information, and in a case where it is determined that the level of the audio-video data does not match the authority of the audio-video retrieval platform, the network and data security situation awareness platform dynamically adjusts a security protection strategy of at least one other gateway in the dynamic orchestration-based audio-video security protection system; wherein security of the adjusted security protection strategy is higher than the security of security protection strategy before adjustment.

According to a second aspect of an embodiment of the present application, a dynamic orchestration-based audio-video security protection system is provided, which comprises: a network and data security situation awareness platform and a security sharing gateway; wherein
  the security sharing gateway is configured to identify a level of audio-video data in an audio-video code stream and an authority of an audio-video retrieval platform before forwarding the audio-video code stream to the audio-video retrieval platform; in a case where the security sharing gateway retrieves no platform authority corresponding to the level of the audio-video data, report alarm information to the network and data security situation awareness platform, wherein the alarm information comprises the level of the audio-video data and the authority of the audio-video retrieval platform;
  the network and data security situation awareness platform is configured to issue a platform authority corresponding to the level of the audio-video data to the security sharing gateway according to the alarm information sent by the security sharing gateway, and in a case where it is determined that the level of the audio-video data does not match the authority of the audio-video retrieval platform, dynamically adjust a security protection strategy of at least one other gateway in the dynamic orchestration-based audio-video security protection system; wherein security of the adjusted security protection strategy is higher than security of the security protection strategy before adjustment.

According to a third aspect of an embodiment of the present application, an electronic device comprising a processor and a memory is provided, wherein
  the memory is configured to store a computer program;
  the processor is configured to perform the method provided in the above first aspect when executing a program stored on the memory.

In the dynamic orchestration-based audio-video security protection method in an embodiment of the present application, by provision of the security sharing gateway and the network and data security situation awareness platform, the security sharing gateway can identify a level of audio-video data in an audio-video code stream and an authority of an audio-video retrieval platform before forwarding the audio-video code stream to the audio-video retrieval platform; in a case where the security sharing gateway retrieves no platform authority corresponding to the level of the audio-video data, the security sharing gateway can report alarm information to the network and data security situation awareness platform, wherein the alarm information comprises the level of the audio-video data and the authority of the audio-video retrieval platform, so that the network and data security situation awareness platform issues a platform authority corresponding to the level of the audio-video data to the security sharing gateway according to the alarm information, and in a case where it is determined that the level of the audio-video data does not match the authority of the audio-video retrieval platform, dynamically adjusts a security protection strategy of at least one other gateway in the dynamic orchestration-based audio-video security protection system, strengthens the security of the security protection strategy, thereby improving the security of audio-video data.

BRIEF DESCRIPTION OF DRAWINGS

FIG. 1 is a schematic flow diagram showing a dynamic orchestration-based audio-video security protection method according to an example of the present application.

FIG. 2 is a schematic structural diagram showing a dynamic orchestration-based audio-video security protection system according to an example of the present application.

DETAILED DESCRIPTION

Figure 3:
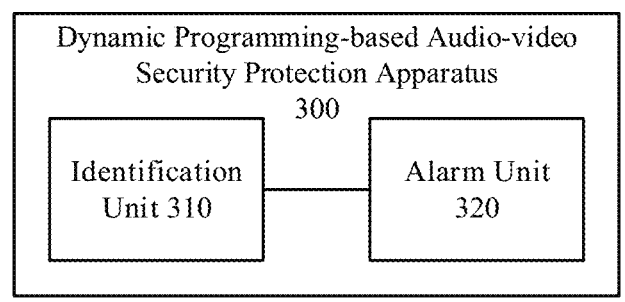
FIG. 3 is a schematic structural diagram showing a dynamic orchestration-based audio-video security protection apparatus according to an example of the present application.

The embodiments will be explained here in detail, examples of which are illustrated in the accompanying drawings. Where the following description refers to the accompanying drawings, like numbers in different drawings indicate the same or similar elements, unless otherwise indicated. The embodiments described in the following examples do not represent all embodiments consistent with the present application. Rather, they are merely examples of apparatus and methods consistent with certain aspects of the present application as detailed in the appended claims.

The terminology used herein is for the purpose of describing particular embodiments only and is not intended to be limiting of the present application. As used in the present application and the appended claims, the singular forms "a", "an", "said" and "the" are intended to include the plural forms as well, unless the context clearly indicates otherwise.

In order that a person skilled in the art may better understand the technical solutions provided by the embodiments of the present application and make the above objects, features and advantages of the embodiments of the present application more apparent and easily understood, further detailed description of the technical solutions of the embodiments of the present application will be provided below in conjunction with the accompanying drawings.

Referring to FIG. 1, FIG. 1 is a flow diagram showing a dynamic orchestration-based audio-video security protection method provided in an embodiment of the present application. The method is applicable to a dynamic orchestration-based audio-video security protection system, wherein the system includes a security sharing gateway and a network and data security situation awareness platform. As shown in FIG. 1, the dynamic orchestration-based audio-video security protection method may include the following steps S100 and S110.

In step S100, before forwarding an audio-video code stream to an audio-video retrieval platform, the security sharing gateway identifies a level of audio-video data in the audio-video code stream, and the audio-video retrieval platform's authority.

In an embodiment of the present application, in order to enhance the security of audio-video data transmission, the transmitted audio-video data can be subjected to security protection processing.

Accordingly, the dynamic orchestration-based audio-video security protection system may include a security sharing gateway, and the security sharing gateway may be used for security protection of the transmitted audio-video data.

Illustratively, the security sharing gateway may be deployed between an audio-video data source and a device acquiring audio-video data from the audio-video source, to provide security protection for the audio-video data acquired from the audio-video data source, or the security sharing gateway may be deployed among platforms performing audio-video data sharing, and perform security protection on the audio-video data shared among the platforms.

Illustratively, the security protection of the transmitted audio-video data can be achieved by matching the level of audio-video data with an authority of the audio-video retrieval platform (the platform acquiring the audio-video data).

Correspondingly, before forwarding the audio-video code stream to the audio-video retrieval platform, the security sharing gateway can identify the level of audio-video data in the audio-video code stream and the audio-video retrieval platform's authority.

For example, it can be determined that the audio-video data in the audio-video code stream belongs to categories such as audio data, video data, traffic signaling data, etc. and it can be determined that the audio-video data belongs to a public area, a private area or a confidential area, etc. according to the fine granularity of identification; and the level of the audio-video data is determined based on the category of the audio-video data and the area to which it belongs.

For example, the audio-video data may be graded in four levels 1-4, with level 4 being the highest.

For different levels of audio-video data, the authority requirements for the audio-video retrieval platform (i.e., a platform requesting to acquire audio-video data) are different.

Illustratively, the higher the audio-video data level, the higher the authority requirements of the audio-video retrieval platform.

Illustratively, the audio-video retrieval platform's authority may be determined based on one or more of platform identity, platform IP address, Media Access Control (MAC) address, and Global Positioning System (GPS) address.

It should be noted that in an embodiment of the present application, the authority of the platform may also be determined according to time, i.e., the authority of the same platform may be different at different time, and the specific implementation thereof will not be described in detail herein.

Illustratively, for any security sharing gateway, in the case where the security sharing gateway is deployed to an actual networking, a corresponding relationship between an initial level of audio-video data and a platform authority may be determined according to the actual networking.

For example, for a security sharing gateway deployed between an Internet protocol camera (IPC) 1 and an audio-video retrieval platform 1 (which is merely for example, and a security sharing gateway can connect multiple IPCs and/or multiple platforms), where the audio-video retrieval platform 1 has the authority to acquire the audio-video data of the IPC 1, a corresponding relationship between the level of the audio-video data of the IPC 1 and the authority of the platform can be deployed in the security sharing gateway.

In step S110, in the case where the security sharing gateway does not retrieve a platform authority corresponding to the level of the audio-video data, the security sharing gateway reports alarm information to the network and data security situation awareness platform, wherein the alarm information includes the level of the audio-video data and the audio-video retrieval platform's authority. The network and data security situation awareness platform issues a platform authority corresponding to the level of the audio-video data to the security sharing gateway according to the alarm information, and in the case where it is determined that the level of the audio-video data does not match the authority of the audio-video retrieval platform, the network and data security situation awareness platform dynamically adjusts the security protection strategy of at least one other gateway in the dynamic orchestration-based audio-video security protection system; wherein the security of the adjusted security protection strategy is higher than the security of the security protection strategy before adjustment.

In an embodiment of the present application, in the case where the level of the audio-video data and the authority of the audio-video retrieval platform are identified by the security sharing gateway, the security sharing gateway can query whether there is a platform authority corresponding to the level of the audio-video data according to the level of the audio-video data.

To ensure the security of the audio-video data, in the case where the security sharing gateway does not retrieve a platform authority corresponding to the level of the audio-video data, the security sharing gateway reports the alarm information to the network and data security situation awareness platform.

For example, when a certain IPC is moved from a public area to a private area, the level of the audio-video data collected by the IPC will increase; the audio-video data level and the platform authority initially configured by a security sharing gateway in the original networking may not be matched with a new audio-video data level; and the security sharing gateway may not be able to retrieve a corresponding platform authority according to the new level of the audio-video data.

Illustratively, the alarm information may include the level of the audio-video data and the authority of the audio-video retrieval platform.

Illustratively, in the case where the network and data security situation awareness platform receives the alarm information, the network and data security situation awareness platform may determine a platform authority corresponding to the level of the audio-video data, and issue the platform authority corresponding to the level of the audio-video data to the security sharing gateway.

It needs to be stated that in an embodiment of the present application, in the case where the network and data security situation awareness platform determines a platform authority corresponding to the level of the audio-video data, in addition to issuing the platform authority corresponding to the level of the audio-video data to the security sharing gateway which reported the alarm information, the network and data security situation awareness platform may further issue the platform authority corresponding to the level of the audio-video data to other security sharing gateways in the system.

On this basis, in the case where the security sharing gateway needs to forward the audio-video code stream comprising the audio-video data of the level again, the security sharing gateway may verify the authority of the audio-video retrieval platform according to the platform authority corresponding to the level of the audio-video data; and in the case where it is determined that the authority of the audio-video retrieval platform does not match the level of the audio-video data, the security sharing gateway may intercept the audio-video code stream to be forwarded to avoid that: due to changes in the level of the audio-video data, such as a change in a level of audio-video data caused by a migration of an IPC from a public area to a private area, high-level audio-video data is acquired by a low-authority platform, further leading to a leakage of important audio-video data. In this way, the security of audio-video data can be improved.

In addition, the network and data security situation awareness platform determines whether the authority of the audio-video retrieval platform can match the level of the audio-video data. In the case where it is determined that the level of the audio-video data does not match the authority of the audio-video retrieval platform, i.e., a platform which does not have a corresponding data retrieval authority requests to review the high-level audio-video data, it is indicated that the level of the audio-video data may change from low to high, and security protection needs to be strengthened, or the retrieval may belong to an attack behavior, and there is an attack risk; in this case, the security protection strategy of at least one other gateway in the dynamic orchestration-based audio-video security protection system may also be dynamically adjusted to improve the security of the audio-video data.

The security of the adjusted security protection strategy is higher than the security of the security protection strategy before adjustment.

In one example, in the process of dynamically adjusting the security protection strategy of at least one other gateway in the dynamic orchestration-based audio-video security protection system, the network and data security situation awareness platform can determine gateways through which the audio-video data flows, and among these gateways, determine gateways other than the security sharing gateway which reports alarm information as other gateways which need to adjust the security protection strategy to realize more targeted security protection strategy reinforcement, and better ensure the security of the audio-video data in the case of fewer adjustments.

Illustratively, the security protection strategy adjustment may include, but is not limited to one or more of encoding layer encryption strategy adjustment, data flow authority control strategy adjustment, sensitive data desensitization strategy adjustment, and encoding layer watermark strategy adjustment.

Encoding layer encryption strategy adjustment may include, but are not limited to one or more of key update period adjustment, algorithm strength adjustment and key strength adjustment.

The data flow authority control strategy adjustment may include, but is not limited to adjusting a corresponding relationship between a level of audio-video data and a platform authority, and/or adjusting a corresponding relationship between a level of audio-video data and an authority of an audio-video retrieval party.

The sensitive data desensitization strategy is used for instructing to desensitize specified audio-video data in the audio-video data; and the sensitive data desensitization strategy adjustment includes the adjustment of a specified audio-video data type and/or the adjustment of a specified audio-video data proportion.

The encoding layer watermark strategy adjustment includes one or more of adjustment of information contained in encoded watermark, watermark superimposition frequency adjustment and watermark verification frequency adjustment.

It needs to be stated that in an embodiment of the present application, in the case where the security sharing gateway retrieves the platform authority corresponding to the level of the audio-video data, but determines that an authority of the audio-video retrieval platform does not match the level of the audio-video data, i.e., the audio-video retrieval platform does not have the authority to acquire the audio-video data, the security sharing gateway can intercept the audio-video code stream and refuse to forward the audio-video code stream to the audio-video retrieval platform.

In addition, in an embodiment of the present application, for any gateway in a dynamic orchestration-based audio-video security protection system, in the case where the gateway performs audio-video code stream interception, a corresponding interception log can be generated, where information such as an interception time and an interception reason can be recorded in the interception log, so that relevant personnel can perform relevant processing according to the interception log, and the specific implementation is not described in detail in the embodiment of the present application.

It can be seen that in the method flow as shown in FIG. 1, by provision of the security sharing gateway and the network and data security situation awareness platform, the security sharing gateway can identify a level of audio-video data in an audio-video code stream and an authority of an audio-video retrieval platform before forwarding the audio-video code stream to the audio-video retrieval platform; in the case where the security sharing gateway does not retrieve a platform authority corresponding to the level of the audio-video data, the security sharing gateway can report alarm information to the network and data security situation awareness platform, where the alarm information may include the level of the audio-video data and the authority of the audio-video retrieval platform, so that the network and data security situation awareness platform issues the platform authority corresponding to the level of the audio-video data to the security sharing gateway according to the alarm information, and in the case where it is determined that the level of the audio-video data does not match the authority of the audio-video retrieval platform, dynamically adjusts security protection strategies of at least one other gateway in the dynamic orchestration-based audio-video security protection system, strengthens the security of the security protection strategies, thereby further improving the security of audio-video data.

In some embodiments, the dynamic orchestration-based audio-video security protection method provided in an embodiment of the present application may further include:

in the case where the security sharing gateway determined that the authority of the audio-video retrieval platform matches the level of the audio-video data in the audio-video code stream, performing, by the security sharing gateway, application-layer protocol parsing on the audio-video code stream to determine whether a hash-based message authentication code (HMAC) value exists in the audio-video code stream; and in the case where the HMAC value does not exist in the audio-video code stream, performing, by the security sharing gateway, encoding-layer watermark addition on the audio-video data in the audio-video code stream, generating a first HMAC value according to a randomly generated first key and the encoding-layer watermark, and encapsulating the first HMAC value and a cipher text of the first key into a security parameter struct; where the cipher text of the first key is obtained by encrypting the first key according to a first protection key, and the first protection key is obtained by application according to a first unique identification.

Illustratively, to facilitate determining flow information of the audio-video code stream, the security sharing gateway may also perform encoding layer watermark addition on the forwarded audio-video code stream.

Illustratively, the encoding layer watermark may include visible watermark or invisible watermark.

Illustratively, to avoid tampering of the watermark, the watermark may be added in a chain structure.

Illustratively, in the case where the security sharing gateway determined that the authority of the audio-video retrieval platform matches the level of the audio-video data in the audio-video code stream, the security sharing gateway performs application-layer protocol parsing on the audio-video code stream to determine whether a Hash-based Message Authentication Code (HMAC) value exists in the audio-video code stream.

In the case where there is no HMAC value in the audio-video code stream, that is to say, the audio-video code stream has not been subjected to superimposition of a watermark of a chain structure according to the method provided in the embodiment of the present application, the security sharing gateway can perform encoding layer watermark addition on the audio-video data in the audio-video code stream, and randomly generate a key (which can be a first key), and generate a corresponding HMAC value (which can be a first HMAC value) according to the first key and the encoding layer watermark.

For example, assuming that the first key is key1, the first HMAC value may be HMAC (key1, watermark data); where the watermark data is an encoding layer watermark added by the security sharing gateway for the data of the audio-video code stream.

In addition, since the first key is used for the verification of the HMAC value, to ensure the security of the first key, the security sharing gateway may further request a protection key (referred to as a first protection key herein) from a key management system according to a unique identification (referred to as a first unique identification herein), and use the first protection key to encrypt the first key to obtain cipher text of the first key; furthermore, the security sharing gateway may encapsulate the first HMAC value and the cipher text of the first key into a security parameter struct, so that watermark data verification may be performed according to the first HMAC value and the cipher text of the first key in subsequent processes.

In some embodiments, after determining whether a HMAC value exists in the audio-video code stream, the method further comprises:

in the case where an HMAC value exists in the audio-video code stream, acquiring, by the security sharing gateway, a second HMAC value and cipher text of a second key in a security parameter struct, requesting a first protection key according to a first unique identification, decrypting the cipher text of the second key using the first protection key to obtain the second key, and generating a third HMAC value according to the encoding layer watermark of the audio-video data and the second key;

in the case where the third HMAC value is inconsistent with the second HMAC value, intercepting, by the security sharing gateway, the audio-video code stream; and/or, in the case where the third HMAC value is consistent with the second HMAC value, adding, by the security sharing gateway, an encoding layer watermark on the audio-video data in the audio-video code stream, and generating a fourth HMAC value according to a randomly generated third key, the encoding layer watermark added at the present node (i.e., the present security sharing gateway), and the second HMAC value, and encapsulating the fourth HMAC value and cipher text of the third key into a security parameter struct; where the cipher text of the third key is obtained by encrypting the third key according to a second protection key, and the second protection key is obtained by application according to a second unique identification.

Illustratively, in the case where an HMAC value exists in an audio-video code stream, that is to say, the audio-video code stream has been subjected to superposition of a watermark of a chain structure according to the method provided in the embodiment of the present application, the security sharing gateway may acquire an HMAC value (which can be referred to as a second HMAC value) in a security parameter struct and cipher text of a key (which can be referred to as cipher text of a second key), and request a first protection key according to a first unique identification, and use the first protection key to decrypt the cipher text of the second key to obtain the second key, and according to encoding-layer watermark of the audio-video data and the second key, generate a corresponding HMAC value (which may be referred to as a third HMAC value), and then determine whether the watermark has been tampered with by comparing the second HMAC value with the third HMAC value.

In an example, in a case where the third HMAC value is inconsistent with the second HMAC value, i.e., the watermark in the audio-video code stream is tampered with, the security sharing gateway may intercept the audio-video code stream.

In another example, in a case where the third HMAC value is consistent with the second HMAC value, i.e. the watermark in the audio-video code stream is not tampered with, the security sharing gateway may further perform watermark addition according to a chain structure.

Illustratively, the security sharing gateway adds an encoding-layer watermark on the audio-video data in the audio-video code stream, randomly generates a key (which may be referred to as a third key), and generates a corresponding HMAC value (which may be referred to as a fourth HMAC value) according to the third key, the encoding-layer watermark added at the present node and the second HMAC value.

For example, the fourth HMAC value may be HMAC (key3, the watermark data of the present node XOR the second HMAC value), where key3 is the third key.

The security sharing gateway may further request a protection key (which may be referred to as a second protection key) from a key management system according to a unique identification (which may be referred to as a second unique identification), and encrypt the third key using the second protection key to obtain cipher text of the third key, and then encapsulate the fourth HMAC value and the cipher text of the third key into the security parameter struct.

It should be noted that in an embodiment of the present application, the first unique identification and the second unique identification may be the same or different.

In a case where the first unique identification and the second unique identification are the same, the first protection key and the second protection key may be the same. In addition, in this case, the unique identification can be uniformly configured in each security sharing gateway or carried in the security parameter struct of the audio-video code stream.

In a case where the first unique identification and the second unique identification are different, each security sharing gateway may respectively configure its own unique identification, and each security sharing gateway may carry the unique identification configured at the present node in the security parameter struct.

In some embodiments, the dynamic orchestration-based audio-video security protection system may further include a security access gateway, and the dynamic orchestration-based audio-video security protection method provided in an embodiment of the present application may further include:

for an audio-video code stream output by an audio-video source, performing, by the security access gateway, application layer protocol parsing on the audio-video code stream, and performing encryption and integrity protection processing on audio-video data in the audio-video code stream;

replacing, by the security access gateway, the audio-video data before processing with the processed audio-video data, and re-encapsulating the processed audio-video data into an audio-video code stream.

In some embodiments, in a case where the security sharing gateway determined that the authority of the audio-video retrieval platform matches the level of the audio-video data in the audio-video code stream, the method may further include:

comparing the authority of the audio-video retrieval platform with the authority of an audio-video retrieved platform;

in a case where the authority of the audio-video retrieval platform is lower than the authority of the audio-video retrieved platform, intercepting the audio-video code stream, or desensitizing specified audio-video data in the audio-video code stream.

Illustratively, to improve security of audio-video data, in a case where it is determined that the authority of the audio-video retrieval platform matches the level of the audio-video data in the audio-video code stream, the security sharing gateway may further compare the authorities of the platforms of both parties of the sharing.

In a case where the authority of the audio-video retrieval platform is lower than the authority of the audio-video retrieved platform, the audio-video code stream can be intercepted according to a current security strategy to avoid audio-video data flowing from the high-authority platform to the low-authority platform; or specified audio-video data in the audio-video code stream may be desensitized, i.e., some of audio-video data is shared.

For example, desensitization processing such as removing or mosaicking Network Abstract Layer Unit (NALU) key frame data in an audio-video code stream to be shared can be performed. In an embodiment of the present application, to realize the security protection of audio-video data at a source and avoid modifying the audio-video source, security protection processing can be performed on an audio-video code stream output by an audio-video source (such as an Internet Protocol Camera (IPC)).

Illustratively, a security access gateway may be deployed between an audio-video source and an audio-video acquisition side, and the security access gateway can be used for performing security protection processing on an audio-video code stream output by the audio-video source.

For an audio-video code stream output by an audio-video source, the security access gateway performs application-layer protocol parsing on the audio-video code stream, and performs encryption and integrity protection processing on audio-video data in the audio-video code stream.

Illustratively, such application-layer protocols may include, but are not limited to, the Real Time Streaming Protocol (RTSP) protocol, the GB28181 (a video surveillance standard) protocol, the Open Network Video Interface Forum (ONVIF) protocol, or a specified proprietary protocol, etc.

Illustratively, an encryption key and an Initialization Vector (IV) may be randomly generated by a cryptographic device, and audio-video data in the audio-video code stream is encrypted based on the encryption key and the IV.

Illustratively, an encryption key may be encrypted by a protection key requested from a key management system, and then written into a security parameter struct in the form of cipher text, and encapsulated to a specified location of a Program Stream (PS) package.

Illustratively, the security parameter struct may further include a unique identification of the above-mentioned IV and the above-mentioned protection key and an audio-video retrieval party can request the same encryption key from the key management system using the same identification to correctly decrypt the cipher text of the key in the security parameter struct, and then perform decryption with the same algorithm and IV to obtain the audio-video data.

Illustratively, the key used to encrypt the audio-video data may be updated on demand, e.g., periodically, with an update period of less than 1 hour, such as 10 minutes, 15 minutes, etc.

Illustratively, the integrity protection processing may include, but is not limited to signature or HMAC-based data integrity protection.

Taking the HMAC-based data integrity protection as an example, by selecting an appropriate hash function, such as SM3, SHA-256, etc. and generating a random key, the data to be processed is encoded, HMAC calculation is performed on the encoded data using the selected hash algorithm and the generated key, and the data to be processed is sent together with the HMAC value to a receiver device. In a case where the receiver device receives the data and the HMAC value, the same hash algorithm and key can be used to calculate an HMAC value, and the calculated HMAC value and the received HMAC value are compared, and if the two are equal, it is indicated that the integrity of the data is protected and the data is not tampered with; if not, there may be a risk of the data being tampered with.

Illustratively, during the process of encryption and integrity protection processing on the audio-video data in the audio-video code stream, some or all of the audio-video data in the audio-video code stream may be encrypted and integrity protected.

For example, one or more Network Abstract Layer Units (NALUs) in a PS packet may be encrypted and signed.

Encrypting and signing the NALU may include, encrypting and signing NALU's Raw Byte Sequence Payload (RBSP) data.

For example, the RBSP data of the NALU is encrypted based on the SM4 OFB algorithm (a cryptographic algorithm) to obtain cipher text, and the RBSP data of the NALU is signed using an SM2 with SM3 algorithm (a cryptographic algorithm combination) to obtain signature information.

In a case where encryption and integrity protection processing have been performed on the audio-video data in the audio-video code stream in the above-mentioned manner, the security access gateway can replace the audio-video data before processing with the processed audio-video data and re-encapsulate the processed data into the audio-video code stream.

Illustratively, in an embodiment of the present application, for an audio-video code stream output by an audio-video source, the audio-video code stream is also subject to packet legality check, in addition to the encryption and integrity protection processing on audio-video data in the audio-video code stream in the above-mentioned manner.

For example, some methods such as regular expression matching, protocol packet keyword matching and data dictionary, etc., are adopted to detect an illegal packet, and if data with an abnormal format, sensitive information or an abnormal authority is found in a packet, the packet is intercepted and alarm information is reported.

In some embodiments, a dynamic orchestration-based audio-video security protection system may further include a security storage gateway, and the dynamic orchestration-based audio-video security protection method provided in an embodiment of the present application may further include:

for an audio-video code stream to be stored, in a case where the audio-video code stream is to be stored in a cloud storage, performing, by the security storage gateway, encryption and integrity protection processing on an audio-video file corresponding to the audio-video code stream, and storing the processed audio-video code stream in the cloud storage;

and/or, for the audio-video code stream to be stored, in a case where the audio-video code stream is to be stored in a video recorder device, performing, by the security storage gateway, application layer protocol parsing on the audio-video code stream, performing encryption and integrity protection processing on the audio-video data in the audio-video code stream, replacing the audio-video data before processing with the processed audio-video data, re-encapsulating the processed audio-video data into an audio-video code stream, and storing the audio-video code stream in a hardware storage device.

Illustratively, to improve the security during the storage of audio-video data, security protection processing can also be performed on an audio-video code stream to be stored.

For example, a security storage gateway can be provided at a boundary of an audio-video storage side, and the security storage gateway can be used for performing security protection processing on an audio-video code stream to be stored in an audio-video storage device.

Illustratively, for an audio-video code stream to be stored, different ways of encryption protection can be dynamically orchestrated for cloud storage and video recorder devices, such as Central Video Recorder (CVR) or Network Video Recorder (NVR).

For a cloud storage scenario, i.e., in the case where an audio-video code stream is to be stored in a cloud storage, since audio-video data is usually stored in the form of an audio-video file, a security storage gateway may perform encryption and integrity protection processing on an audio-video file corresponding to the audio-video code stream, and store the processed audio-video file in the cloud storage.

In one example, the above-mentioned security storage gateway performing encryption and integrity protection processing on the audio-video code stream may include:

performing, by the security storage gateway, encryption and integrity protection processing on an audio-video file corresponding to the audio-video code stream using a security protection plug-in in an operating system kernel of a storage node where the audio-video code stream is to be stored; where the security protection plug-in acts between a virtual file system and an underlying file system and is used for performing encryption and integrity protection processing on the stored audio-video file.

Illustratively, for a cloud storage scenario, the security storage gateway may issue a kernel module (referred to as a security protection plug-in herein) to an operating system kernel of a storage node where an audio-video code stream is to be stored, and the security protection plug-in acts between a virtual file system and an underlying file system and is used for performing encryption and integrity protection processing on the stored audio-video file.

Accordingly, for an audio-video code stream to be stored in a cloud storage, the security storage gateway can perform encryption and integrity protection processing on an audio-video file corresponding to the audio-video code stream using a security protection plug-in in an operating system kernel of the storage node where the audio-video code stream is to be stored.

For example, SM4 CTR algorithm (an encryption algorithm) can be used to encrypt the audio-video file corresponding to the audio-video code stream, and HMAC-SM3 algorithm (a message authentication algorithm) can be used to perform integrity protection on the audio-video file corresponding to the audio-video code stream.

Illustratively, in a case where an audio-video file is retrieved from a cloud storage, the above-mentioned security protection plug-in may further be used to perform decryption and integrity verification processing on the retrieved audio-video file, so that in a case where a storage hardware (such as a hard disk) of a cloud storage node is forcibly removed and installed to other nodes, the audio-video file in the hard disk cannot be decrypted.

By means of the above-mentioned security protection plug-in, the security of storage of an audio-video code stream can be ensured, and the effect of the relevant processing being completely transparent to an upper application can be achieved (a kernel module acts between a virtual file system and an underlying file system, and the processing such as encryption and decryption, and integrity protection/verification, etc. are not perceived by an upper-layer application).

For a video recorder device scenario, i.e., in the case where an audio-video code stream is to be stored in the video recorder device, since in the process of storing the audio-video code stream into a hardware storage device, audio-video data is usually dynamically allocated and stored in a track with a corresponding track number of an internal hard disk for storage acceleration. Therefore, the security storage gateway can perform application layer parsing on the audio-video code stream, perform encryption and integrity protection processing on the audio-video data in the audio-video code stream, replace the audio-video data before processing with the processed audio-video data, and re-encapsulate the processed audio-video data into the audio-video code stream and store the audio-video code stream in the hardware storage device.

It should be noted that in a case where audio-video data in an audio-video code stream is encrypted data, for example, in a process of outputting the audio-video code stream from an audio-video source, the encryption is performed in the manner described in the above-mentioned embodiment, and in this case, the audio-video data can be subject to a superimposition of encryption, i.e., the encrypted audio-video data is encrypted again.

In some embodiments, a dynamic orchestration-based audio-video security protection method provided in an embodiment of the present application may further include:

for the audio-video code stream to be retrieved, intercepting, by the security storage gateway, the audio-video code stream in a case where it is determined that an authority of the audio-video retrieval party does not match a level of the audio-video data in the audio-video code stream.

Illustratively, to improve the security of an audio-video code stream in a storage device, when reading the audio-video code stream from the storage device, it is required to perform authority adaptation on the audio-video retrieval party.

Accordingly, for the audio-video code stream to be retrieved, on the one hand, a level of audio-video data in the audio-video code stream can be identified, on the other hand, an authority of the audio-video retrieval party can be determined, and whether the authority of the audio-video retrieval party matches the level of the audio-video data in the audio-video code stream can be determined.

The audio-video code stream is intercepted in the case where it is determined that the authority of the audio-video retrieval party does not match the level of the audio-video data in the audio-video code stream.

In some embodiments, the dynamic orchestration-based audio-video security protection system may further include a security display gateway, and the dynamic orchestration-based audio-video security protection method provided in an embodiment of the present application may further include:

for decoded audio-video data to be displayed, the security display gateway adds an encoding-layer visible watermark and an encoding-layer invisible watermark to the audio-video data, and displays the audio-video data added with the watermarks; where information in the encoding-layer visible watermark includes identification information of the audio-video retrieval party and identification information of one or more nodes through which the data flows, information in the encoding layer invisible watermark includes a traceability identification, and the traceability identification is bound to the information included in the encoding-layer visible watermark.

Illustratively, to improve security of audio-video data display, security protection processing may be performed on audio-video data to be displayed.

For example, a security display gateway is deployed between a decoding device and a display screen, and the security display gateway can be used for performing security protection processing on decoded audio-video data to be displayed.

Illustratively, the decoding device may include, but is not limited to a decoder, a splicing controller device, or a video platform matrix.

Illustratively, for the decoded audio-video data to be displayed, the security display gateway adds an encoding-layer visible watermark and an encoding-layer invisible watermark to the audio-video data, and displays the audio-video data added with the watermarks;

where information in the encoding-layer visible watermark includes identification information of an audio-video retrieval party and identification information of one or more nodes through which the data flows, information in the encoding-layer invisible watermark includes a traceability identification, and the traceability identification is bound to the information included in the encoding-layer visible watermark.

Illustratively, the audio-video retrieval party may include a terminal device that posts audio-video data to a large screen through an operation instruction, and the nodes through which data flows may include a decoder (decoder, splicing controller device or video platform matrix) and a large screen, etc.

Illustratively, the identification information of the audio-video retrieval party (or the node through which data flows) may include, but is not limited to one or more of name, IP address, MAC address, etc. of the audio-video retrieval party (the node through which data flows).

In addition, the information in the encoding-layer visible watermark may further include one or more of channel information, system time, etc.

Existence of invisible watermark cannot be perceived when an eavesdropper is shooting a screen, but a unique traceability identification (ID) can be traced, thereby tracing out the above-mentioned bound information.

Illustratively, to improve the accuracy of tracing, for an image needing to be traced, for example, a photograph obtained by taking a screen shot, it can be uploaded through an image upload port, and then a model algorithm is used to firstly remove the noise of moire patterns generated in the photographing, and secondly clean and recombine and integrate all the invisible watermark two-dimensional code information in the shot-screen photograph.

In some embodiments, the dynamic orchestration-based audio-video security protection method provided in an embodiment of the present application may further include:
  for decoded audio-video data to be displayed, the security display gateway performs sensitive information detection on the audio-video data, and intercepts the audio-video data and reports alarm information in a case where it is determined that sensitive information exists in the audio-video data.

Illustratively, to improve the security of audio-video data display, for decoded audio-video data to be displayed, the security display gateway may further perform sensitive information detection on the audio-video data, and intercepts the audio-video data and reports alarm information in a case where it is determined that sensitive information exists in the audio-video data.

In some embodiments, the dynamic orchestration-based audio-video security protection method provided in an embodiment of the present application may further include:
  receiving, by the network and data security situation awareness platform, alarm information; where the alarm information includes a level of the audio-video data and an authority of the audio-video retrieval platform;
  in a case where it is determined that the level of the audio-video data does not match the authority of the audio-video retrieval platform, dynamically adjusting, by the network and data security situation awareness platform, security protection strategies of at least one other gateway in the dynamic orchestration-based audio-video security protection system; where the security of the adjusted security protection strategies are higher than the security of the security protection strategies before adjustment.

Illustratively, for an audio-video code stream to be forwarded to the audio-video retrieval platform, in a case where the security sharing gateway does not retrieve a platform authority corresponding to the level of the audio-video data in the audio-video code stream, the security sharing gateway may report alarm information to the network and data security situation awareness platform, where the alarm information may include the level of the audio-video data and the authority of the audio-video retrieval platform.

In a case where the network and data security situation awareness platform receives the alarm information, the network and data security situation awareness platform may determine a platform authority corresponding to the level of the audio-video data and issue the platform authority corresponding to the level of the audio-video data to the security sharing gateway.

In addition, the network and data security situation awareness platform determines whether the authority of the audio-video retrieval platform can match the level of the audio-video data. In a case where it is determined that the level of the audio-video data does not match the authority of the audio-video retrieval platform, the network and data security situation awareness platform dynamically adjusts security protection strategies of at least one other gateway in the dynamic orchestration-based audio-video security protection system to improve the security of the audio-video data.

The security of the adjusted security protection strategies are higher than the security of the security protection strategies before adjustment.

Illustratively, the security protection strategy adjustment may include, but is not limited to one or more of encoding-layer encryption strategy adjustment, data flow authority control strategy adjustment, sensitive data desensitization strategy adjustment, and encoding-layer watermark strategy adjustment.

Encoding-layer encryption strategy adjustment may include, but is not limited to one or more of key update period adjustment, algorithm strength adjustment and key strength adjustment.

The data flow authority control strategy may include, but is not limited to adjusting a corresponding relationship between a level of audio-video data and a platform authority, and/or adjusting a corresponding relationship between a level of audio-video data and an authority of an audio-video retrieval party.

The sensitive data desensitization strategy is used for instructing to desensitize specified audio-video data in the audio-video data; and the sensitive data desensitization strategy adjustment includes the adjustment of a specified audio-video data type and/or the adjustment of a specified audio-video data proportion.

The encoding layer watermark strategy adjustment includes one or more of adjustment of information contained in encoded watermark, watermark superimposition frequency adjustment and watermark verification frequency adjustment.

In an example, the dynamically adjusting security protection strategies of at least one other gateway in the dynamic orchestration-based audio-video security protection system may include:
  for a security sharing gateway, performing one or more of encoding-layer encryption strategy adjustment, data flow authority control strategy adjustment, sensitive data desensitization strategy adjustment, and encoding-layer watermark strategy adjustment;

where the encoding-layer encryption strategy adjustment includes one or more of shortening a key update period, improving algorithm strength, and improving key strength;

illustratively, improving algorithm strength may include, but is not limited to improving the strength of an encryption algorithm and/or improving the strength of a signature algorithm.

The data flow authority control strategy adjustment includes adding a platform authority corresponding to a new audio-video data level; i.e., a corresponding relationship between a level of audio-video data and a platform authority is added (a new data flow authority control rule is added) to specify the platform authority required by the new audio-video data level, avoid an audio-video data stream with a high level flowing to a low-authority platform, and realize the update control of a flow path of the audio-video code stream.

The sensitive data desensitization strategy adjustment includes increasing the proportion of specified audio-video data in the audio-video data and/or extending the type of the specified audio-video data;

the encoding-layer watermark strategy adjustment includes one or more of increasing information contained in the encoded watermark, increasing a watermark superimposition frequency and increasing a watermark verification frequency.

In an example, the dynamically adjusting security protection strategies of at least one other gateway in the dynamic orchestration-based audio-video security protection system includes:

for a security access gateway, performing encoding-layer encryption strategy adjustment;

where the encoding-layer encryption strategy adjustment may include one or more of shortening a key update period, improving algorithm strength, and improving key strength.

Illustratively, improving algorithm strength may include, but is not limited to improving encryption algorithm strength and/or improving signature algorithm strength.

In an example, the dynamically adjusting security protection strategies of at least one other gateway in the dynamic orchestration-based audio-video security protection system includes:

for the security storage gateway, performing encoding-layer encryption strategy adjustment and/or data flow authority strategy update;

where the encoding-layer encryption strategy adjustment includes one or more of shortening a key update period, improving algorithm strength, and improving key strength.

Illustratively, improving algorithm strength may include, but is not limited to improving encryption algorithm strength and/or improving signature algorithm strength.

The data flow authority control strategy adjustment includes adding an authority of an audio-video retrieval party corresponding to a new level of audio-video data.

In an example, the dynamically adjusting security protection strategies of at least one other gateway in the dynamic orchestration-based audio-video security protection system includes:

for a security display gateway, performing encoding-layer watermark strategy adjustment;

the encoding-layer watermark strategy adjustment includes one or more of increasing information contained in encoded watermark, increasing a watermark superimposition frequency and increasing a watermark verification frequency.

In an embodiment of the present application, for any audio-video code stream, a network and data security situation awareness platform acquires and displays flow information of the audio-video code stream; where the flow information comprises information of a source of the audio-video code stream, and information of the nodes that the audio-video code stream flows through after the audio-video code stream being output from the source;

in a case where the alarm information for the audio-video code stream is acquired, the network and data security situation awareness platform displays the alarm information.

Illustratively, to enable relevant personnel to more intuitively understand the flow process of the audio-video code stream and anomalies in the flow process, the flow information about the audio-video code stream and the anomaly information in the flow process can be displayed.

Illustratively, for any audio-video code stream, flow information about the audio-video code stream is acquired and displayed; where the flow information includes information about a source of the audio-video code stream, and information about nodes (i.e., nodes through which data flows) that the audio-video code stream flows through after the audio-video code stream being output from the source.

In addition, for the audio-video code stream, in the case where the alarm information for the audio-video code stream is acquired, the alarm information is displayed.

For example, the above-mentioned alarm information (such as audio-video data cipher text flowing into an audio-video retrieval party node which should not appear, audio-video data watermark tracing anomaly, audio-video data being decrypted abnormally, etc.) and analysis information of audio-video data (such as monitoring point information, retrieval party information, flow link information, etc.) can be integrated with data portrait depiction and dynamically displayed in a large screen of a supervisor.

To enable a person skilled in the art to better understand the technical solutions provided in embodiments of the present application, the technical solutions provided in the embodiments of the present application are described below in conjunction with specific examples.

Referring to FIG. 2, FIG. 2 is a schematic structural diagram showing an architecture of a dynamic orchestration-based audio-video security protection system provided in an embodiment of the present application, and as shown in FIG. 2, in the dynamic orchestration-based audio-video security protection system, a security access gateway is deployed between an audio-video acquisition side and an audio-video source (taking IPC as an example); a security sharing gateway is deployed between a platform and the audio-video source, and between superior and subordinate platforms; a security storage gateway is deployed at a boundary of an audio-video storage side; a security display gateway is deployed at a boundary of an audio-video large screen display side; an audio-video network and data security situation awareness platform is deployed at a service side and performs strategy linkage with the above-mentioned gateways. The above-mentioned access gateway, sharing gateway, storage gateway and display gateway all have integrated cryptographic devices.

Based on the system architecture shown in FIG. 2, some implementation details of the dynamic orchestration-based audio-video security protection scheme provided by the embodiment of the present application are described below.

I. Protection During Audio-Video Acquisition Phase

A security access gateway is deployed between the audio-video acquisition side and the IPC to perform audio-video source proxy encryption.

Illustratively, a security access gateway may access 1-8 IPCs (the specific number is not limited, and can be adjusted according to actual requirements).

The security access gateway can provide audio-video-source encoding layer encryption, packet legality check, network routing, etc. Audio-video encoding layer encryption can support parsing RTSP protocol, GB28181 protocol, ONVIF protocol, and specified private protocols, etc.

Taking the GB28181 protocol as an example, the key steps include the following.

1.1 The security access gateway continuously receives audio-video stream data and parses the above-mentioned corresponding application-layer protocol.

1.2 A cryptographic device is used to randomly generate a 16-byte encryption key and an IV, and after the encryption key is encrypted by a protection key requested from a key management system, the encryption key is written into a security parameter struct in a cipher text form and is encapsulated into a specified position of a PS packet. The security parameter struct further includes the above-mentioned IV and a unique identification of the above-mentioned protection key (the audio-video retrieval party can correctly decrypt the cipher text of the key in the security parameter struct by requesting the same encryption key from the key management system using the same identification, and then perform decryption with the same algorithm and IV to obtain the audio-video data).

Illustratively, an update period of a key for encrypting audio-video data does not exceed 1 hour.

1.3 Processing is performed in units of one PS packet, to parse one or more NALUs in the PS packet for encryption and signature protection.

Illustratively, the encryption process may include: encrypting NALU's RBSP data using a key randomly generated based on the above SM4 OFB algorithm to obtain cipher text and replace a plain text of the RBSP data with the cipher text.

The signature protection process includes: signing NALU's RBSP data and encapsulating the NALU's RBSP data into NALU using an SM2 with SM3 algorithm.

1.4 The processed NALU and the security parameter struct are encapsulated into a new program stream (PS) stream, and the new PS stream is correspondingly modified for field information such as a header length, and then encapsulated with an original application-layer protocol.

The above-mentioned audio-video encoding layer encryption protection method can be adapted to old devices that have already been deployed and support concurrent encryption of multiple audio-video streams without the need for additional modifications to IPC.

In addition, the legality of packets of an IPC audio-video stream can be checked, for example, some methods such as regular expression matching, protocol packet keyword matching and data dictionary, etc. are adopted to detect an illegal packet, and if data with format and/or authority abnormalities is found in a packet, the packet is intercepted and alarm information is reported to an audio-video network and data security situation awareness platform.

II. Protection During Audio-Video Transmission and Sharing Phase

A security sharing gateway is deployed between a platform and an audio-video source, or between superior and subordinate platforms of audio-video monitoring, and the main function thereof is to prevent illegal interception and tampering of audio-video in a cascade scenario, establish a trusted boundary, and provide security control over audio-video retrieval.

Illustratively, an identity and authority of a cascade platform can be dynamically identified through a model algorithm engine (performing identity verification through an X509 digital certificate, and then verifying whether the identity and authority match), and at the same time, the audio-video stream flowing through the platform can be dynamically identified and classified for hierarchical management.

For example, it is determined that the audio-video data belongs to categories such as audio data, video data and traffic signaling data, and then it is determined that the audio-video data belongs to a public area, a private area or a confidential area, etc. according to the fine granularity of identification.

Illustratively, the audio-video data may be graded in four levels 1-4, with level 4 being the highest.

It can be determined whether the identified data of this type and level matches the identity authority of an audio-video retrieval platform, for example, whether the data is restricted from being reviewed by a certain identity, a certain IP address, a MAC address, a GPS address and/or a certain period, and if an exception is found, interception is performed.

In a case where it is determined that a platform authority corresponding to the level of the audio-video data is not retrieved, the security sharing gateway can report alarm information to the network and data security situation awareness platform.

For example, in a practical scenario, due to the migration of an IPC node (such as transferred from a shooting public area to a private critical area), etc., a sensitivity level of audio-video data flowing between systems will increase, and the original node authority fixedly allocated may not match the transformed data level, for example, a platform that could have acquired audio-video data of an IPC in a public area may not have the authority to acquire the audio-video data of the IPC after the IPC is migrated to a private area, and if the platform is still allowed to acquire the audio-video data of the IPC, it is easy to cause network security events such as data leakage.

In a case where the network and data security situation awareness platform receives the alarm information, the network and data security situation awareness platform may issue a platform authority corresponding to the level of the audio-video data to the security sharing gateway.

For example, the original data flow authority is domain A→domain B→domain D, and domain A→domain C→domain D, i.e., the authority of a platform in the domain B and the authority of a platform in the domain C can both match the level of audio-video data in the domain A. However, in a case where the level of audio-video data in the domain A becomes higher, for example, the IPC of the domain A migrates from a public area to a private area, the network and data security situation awareness platform determines that the platform in the domain B has no authority to review data in the domain A, and may issue a corresponding relationship between a new level of audio-video data in the domain A and a platform authority (the platform authority is higher than the platform authority of the platform in the domain B) to the security sharing gateway between the domains A, B and then the security sharing gateway between the domains A, B will intercept audio-video data transferred from the domain A to the domain B.

Illustratively, the network and data security situation awareness platform can also issue a corresponding relationship between the new level of audio-video data in the domain A and the platform authority to other security sharing gateways (such as a security sharing gateway between domains A,C), and in a case where the platform authority does not exceed the authority of the platform in the domain C, an audio-video data flow link of domain A→domain C→domain D can be reserved.

Illustratively, the network and data security situation awareness platform dynamically adjusts security protection strategies of at least one other gateway in the dynamic orchestration-based audio-video security protection system in a case where it is determined that the level of the audio-video data does not match the authority of the audio-video retrieval platform.

Illustratively, for audio-video data flowing through a security sharing gateway, in a case where an authority of an audio-video retrieval platform matches a level of the audio-video data in the audio-video code stream, multi-level encoding-layer watermark superposition (superposition of a watermark of a chain structure) can be performed.

Taking the GB28181 protocol as an example, the key steps thereof include the following.

2.1 The security sharing gateway continuously receives audio-video stream data and parses the above-mentioned corresponding application-layer protocol.

2.2 Processing is performed in units of one PS packet, to parse one or more NALUs in the PS packet to add an encoding-layer watermark, and information encoded into the watermark may include content such as identification information of an audio-video retrieval party, identification information of a data stream flowing through a platform, channel information and system time.

Illustratively, the watermark is superimposed in a chain structure; after the watermark encoding is finished, HMAC value will be calculated and encapsulated into a security parameter struct; before the next watermark encoding, the HMAC value obtained in the previous watermark encoding may be verified, and if the verification fails, it is indicated that the watermark has been tampered with, the audio-video data is intercepted and alarm information is reported to an audio-video network and data security situation awareness platform. If the verification succeeds, the old HMAC value is taken as a parameter to participate in the new HMAC value calculation.

For example, taking the audio-video data flow of domain A→domain B→domain C as an example.

1. A security sharing gateway between domains A, B randomly generates a HMAC key "key1", and uses a unique identification to request a key encryption key "KEY" from a key management system to encrypt the "key1" and obtain cipher text, and the cipher text of the "key1" is encapsulated into a security parameter struct.

2. The security sharing gateway between domains A, B first checks the original HMAC value.

Illustratively, in this example, since the security sharing gateway between domains A, B is the first security sharing gateway through which audio-video data flows, an HMAC value does not exist in the audio-video data and does not need to be verified.

3. The security sharing gateway between domains A, B calculates a HMAC value, i.e., HMAC (key1, watermark data), on a watermark added by a current node, and encapsulates the value into a security parameter struct.

4. A security sharing gateway between domains B, C firstly checks an original HMAC value; uses a unique identification to request a key encryption key "KEY" from a key management system, decrypts the cipher text of key1 to obtain a plain text of key1, and calculates a HMAC (key1, current watermark data), and compares whether it is consistent with the HMAC value in a security parameter struct.

5. If both the HMAC values are inconsistent, it indicates that the watermark data has been tampered with, the audio-video data is intercepted and alarm information is reported to the audio-video network and data security situation awareness platform.

6. If both the HMAC values are consistent, a HMAC key "key2" is randomly generated and a HMAC (key2, the node watermark data XOR (HMAC (key1, watermark data)) value is calculated. The cipher text of the key 2 encrypted based on KEY, and the HMAC value are encapsulated into the security parameter struct. The purpose of XOR operation is to take the last HMAC value for which the last HMAC verification passes as a parameter to participate in the calculation of a new HMAC value. The subsequent verification step and the chain watermark calculation step are repeated and accumulated in this way.

Illustratively, the encoding-layer watermark calculation supports invoking internal Center Process Unit (CPU), Graphics Processing Unit (GPU) resources, and external Video Processing Unit (VPU) codec card units for load scheduling and codec acceleration in software-hardware coordination.

2.3 The processed NALU and the security parameter struct are encapsulated into a new PS stream, and the new PS stream is correspondingly modified for field information such as a header length, and then encapsulated based on an original application-layer protocol.

Illustratively, in a case where an authority of a audio-video retrieval platform is lower than an authority of an audio-video retrieved platform, data desensitization regulation may be performed, for example, terminating data sharing, or sharing partial data.

Illustratively, in a case where a part of the data is shared, sensitive information in the audio-video stream may be desensitized, e.g., NALU key frame data is removed or mosaicked, etc.

III. Protection During Audio-Video Storage Phase

Illustratively, different ways of encryption protection can be dynamically programmed for both cloud storage and CVR storage scenarios.

For a cloud storage scenario, a file system encryption mode can be used, and a kernel module (i.e., the above-mentioned security protection plug-in) issued by a security storage gateway is installed into an operating system kernel of a corresponding storage node, and the main function thereof is to add a data encryption and decryption and integrity protection layer between a virtual file system and an underlying file system.

In the two processes of data storage and reading, data interception is performed, internal CPU, GPU operation resources or external crypto card/crypto machine operation resources are involved, to perform SM4 CTR encryption and HMAC-SM3 integrity protection on the data, and replace the plain text with the cipher text and encapsulate it into an operating system storage protocol packet.

Illustratively, data of structured, semi-structured and unstructured types, and various audio-video application layer protocols are compliantly supported, i.e., for any application-layer protocol or any data type, binary data stream may be encrypted at a kernel file system before being stored to a hard disk, and the compatibility is strong.

For some CVR storage scenarios, considering that the audio-video data would be dynamically allocated and directly stored in a track with a corresponding track number of an internal hard disk for storage acceleration, therefore, a mode involving protocol parsing and encryption can be used.

An audio-video stream can be subject to application-layer protocol parsing and PS parsing to obtain NALUs, then the NALUs can be subject to SM4 CTR encryption and HMAC-SM3 integrity protection, and re-encapsulated into a PS stream and re-encapsulated with an application-layer protocol according to a reverse of the original parse path, and a finally obtained cipher text is stored in the corresponding CVR hard disk track.

Illustratively, the security storage gateway can further perform dynamic identification and matching on an authority of an audio-video retrieval party, and if an exception is found, the interception is performed and alarm information is reported to the audio-video network and data security situation awareness platform.

IV. Protection During an Audio-Video Large Screen Display Phase

By deploying an audio-video security display gateway between the decoder/splicing controller device/video platform matrix and the large screen, the original decoder/splicing control device/video platform matrix takes streams from a streaming media, and the audio-video data is streamed to the security display gateway by means of stream diversion.

Illustratively, the stream diversion method may include a primary mode (stream diversion by iptables) and a bypass mode (stream diversion through a layer three switch).

The security display gateway will perform a projection of an encoding-layer visible watermark and invisible watermark for the audio-video stream placed on the large screen, where the parse of RTSP, GB28181, ONVIF, and specified private protocols, etc. is compatible.

The information of the visible watermark includes identification information of an audio-video retrieval party, identification information of nodes through which data flows, channel information, system time, etc. The information of the invisible watermark includes a unique trace ID, and when the trace ID is generated by the security display gateway, the trace ID has been associated with identification information of an audio-video retrieval party, identification information of nodes through which data flows, channel information, system time, etc.

An eavesdropper cannot perceive the existence of an invisible watermark when shooting a screen, but can trace a unique ID in a security display gateway or a situation awareness platform, thereby tracing out the above-mentioned associated information.

Illustratively, an image upload port can be provided in a web management interface of a security display gateway or a network and data security situation awareness platform, and for an image needing to be traced, for example, a picture obtained by an eavesdropper shooting a screen, it can be uploaded to the security display gateway or the network and data security situation awareness platform via the image upload port for tracing.

Illustratively, to improve the accuracy of tracing, a security display gateway or a network and data security situation awareness platform can firstly remove the noise of moire patterns generated by photographing, and secondly clean and recombine and integrate all the invisible watermark two-dimensional code information in the shot-screen photograph through a model algorithm.

Illustratively, watermark encoding supports invoking internal CPU, GPU resources and external VPU codec card arithmetic units to perform load scheduling and codec acceleration in software-hardware coordination.

A single security display gateway supports concurrent processing of more than 128 audio-video streams while supporting traffic load scheduling of multiple security display gateways to support a higher number of concurrent streams.

V. Audio-Video Security Situation Perceiving

An audio-video network and data security situation awareness platform (which may be referred to as a situation awareness platform for short) performs data collection and security strategy linkage with a security access gateway, a security sharing gateway, a security storage gateway and a security display gateway. Anomaly information of each module (such as audio-video data cipher text flowing into an audio-video retrieval party node which should not appear, audio-video data watermark tracing anomaly, audio-video data being decrypted abnormally, etc.) and audio-video data analysis information (such as monitoring point information, retrieval party information, flow link information, etc.) are integrated with data portrait depiction, and dynamically displayed in a large screen of a supervisor, and risks are perceived using a model algorithm engine, gateways of each node are linked to perform security strategy reinforcement, and security protection strategies for audio-video (encoding-layer encryption strategy, data flow authority control strategy, sensitive data desensitization strategy, and encoding-layer watermark strategy) are dynamically adjusted.

The methods provided in the present disclosure are described above. The apparatuses provided in the present disclosure are described as follows.

Referring to FIG. 3, FIG. 3 is a schematic structural diagram showing a dynamic orchestration-based audio-video security protection apparatus 300 provided in an embodiment of the present application which is deployed in a security sharing gateway in a dynamic orchestration-based audio-video security protection system, wherein the dynamic orchestration-based audio-video security protection system further comprises a network and data situation awareness platform, and as shown in FIG. 3, the dynamic orchestration-based audio-video security protection apparatus 300 may comprise:

an identification unit 310 configured to, identify a level of audio-video data in an audio-video code stream and an authority of an audio-video retrieval platform before forwarding the audio-video code stream to the audio-video retrieval platform;

an alarm unit 320 configured to, in a case where the security sharing gateway retrieves no platform authority corresponding to the level of the audio-video data, report alarm information to the network and data security situation awareness platform, wherein the alarm information comprises the level of the audio-video data and the authority of the audio-video retrieval platform, so that the network and data security situation awareness platform issues a platform authority corresponding to the level of the audio-video data to the security sharing gateway according to the alarm information, and in a case where it is determined that the level of the audio-video data does not match the authority of the audio-video retrieval platform, the network and data security situation awareness platform dynamically adjusts a security protection strategy of at least one other gateway in the dynamic orchestration-based audio-video security protection system; wherein security of the adjusted security protection strategy is higher than the security of the security protection strategy before adjustment.

Figure 4:
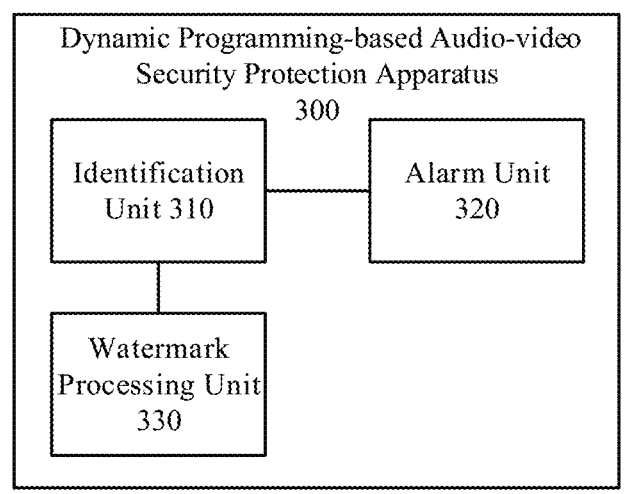
FIG. 4 is a schematic structural diagram showing a dynamic orchestration-based audio-video security protection apparatus according to an example of the present application.

In some embodiments, as shown in FIG. 4, the dynamic orchestration-based audio-video security protection apparatus 300 may further comprise:

a watermark processing unit 330 configured to, in a case where it is determined that the authority of the audio-video retrieval platform matches the level of the audio-video data in the audio-video code stream, perform application-layer protocol parsing on the audio-video code stream to determine whether an HMAC value exists in the audio-video code stream;

in a case where there is no HMAC value in the audio-video code stream, add an encoding-layer watermark on the audio-video data in the audio-video code stream, generate a first HMAC value according to a randomly generated first key and the encoding-layer watermark, and encapsulate the first HMAC value and a cipher text of the first key into a security parameter struct; where the cipher text of the first key is obtained by encrypting the first key according to a first protection key, and the first protection key is obtained by a request according to a first unique identification; or in a case where there is an HMAC value in the audio-video code stream, acquire a second HMAC value and a cipher text of a second key in the security parameter struct, request the first protection key according to the first unique identification, obtain the second key by decrypting the cipher text of the second key using the first protection key, and generate a third HMAC value according to the encoding-layer watermark of the audio-video data and the second key;

in a case where the third HMAC value is inconsistent with the second HMAC value, intercept the audio-video code stream; or in a case where the third HMAC value is consistent with the second HMAC value, add an encoding-layer watermark on the audio-video data in the audio-video code stream, and generate a fourth HMAC value according to a randomly generated third key, the encoding layer watermark added by the present node, and the second HMAC value, and encapsule the fourth HMAC value and a cipher text of the third key into the security parameter struct; where the cipher text of the third key is obtained by encrypting the third key according to a second protection key, and the second protection key is obtained by a request according to a second unique identification.

An embodiment of the present application further provides an electronic device comprising a processor and a memory, wherein the memory is used for storing a computer program; the processor is configured to perform the above-described dynamic orchestration-based audio-video security protection method when executing a program stored in the memory.

Figure 5:
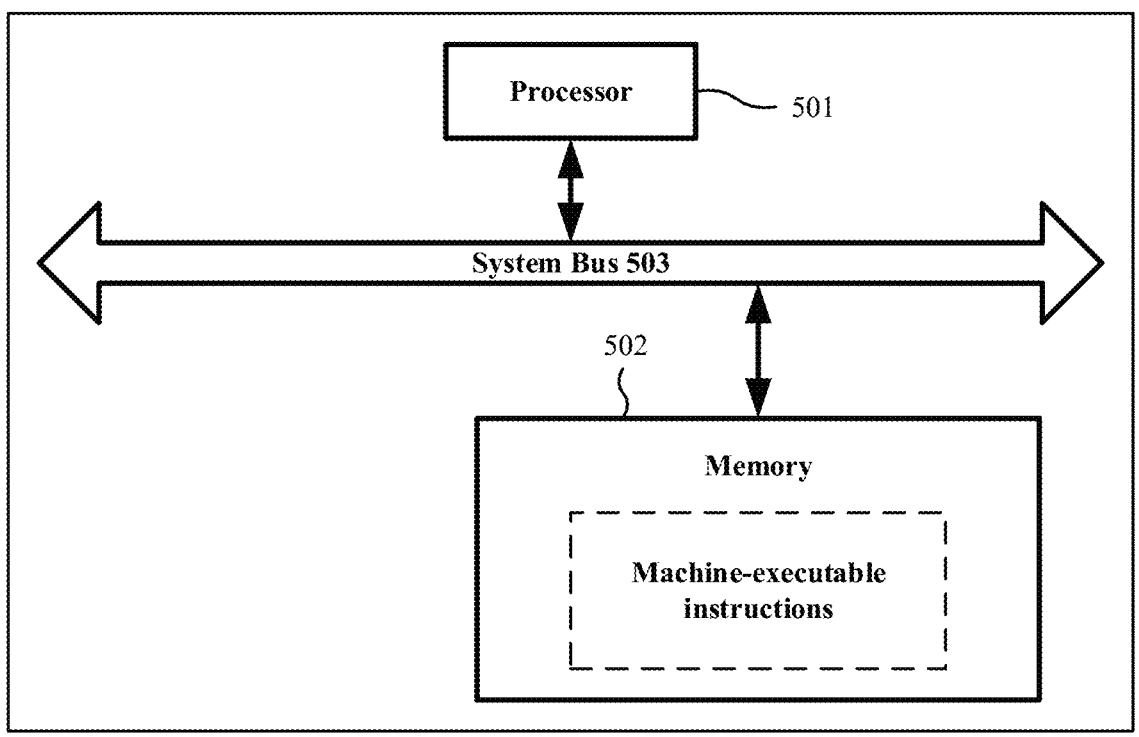
FIG. 5 is a schematic hardware structural diagram showing an electronic device according to an example of the present application.

Referring to FIG. 5, FIG. 5 is a schematic structural diagram showing a hardware of an electronic device according to an embodiment of the present application. The electronic device may include a processor 501, a memory 502 storing machine-executable instructions. The processor 501 and the memory 502 may communicate via a system bus 503. Also, by reading and executing machine-executable instructions in the memory 502 corresponding to dynamic orchestration-based audio-video security protection logic, the processor 501 may perform the dynamic orchestration-based audio-video security protection method described above.

The memory 502, as referred to herein, can be any electronic, magnetic, optical, or other physical storage apparatuses that can contain or store information, such as executable instructions, data, and the like. For example, the machine-readable storage medium may be: an Radom Access Memory (RAM), a volatile memory, a non-volatile memory, a flash memory, a flash memory, a storage drive (such as a hard disk drive), a solid state hard disk, any type of storage disk (such as an optical disk, a dvd, etc.), or a similar storage medium, or a combination thereof.

In some embodiments, a machine-readable storage medium is further provided, such as the memory 502 shown in FIG. 5, storing machine-executable instructions that, when executed by a processor, perform the above-described dynamic orchestration-based audio-video security protection method. For example, the machine-readable storage medium may be an ROM, an RAM, a CD-ROM, a magnetic tape, a floppy disk, an optical data storage device, etc.

An embodiment of the present application further provides a computer program product that stores a computer program and, when executed by a processor, the computer program causes the processor to perform the dynamic orchestration-based audio-video security protection method described above.

An embodiment of the present application further provides a dynamic orchestration-based audio-video security protection system comprising: a network and data security situation awareness platform and a security sharing gateway; wherein the security sharing gateway is configured to identify a level of audio-video data in an audio-video code stream and an authority of an audio-video retrieval platform before forwarding the audio-video code stream to the audio-video retrieval platform; in a case where the security sharing gateway retrieves no platform authority corresponding to the level of the audio-video data, report alarm information to the network and data security situation awareness platform, where the alarm information includes the level of the audio-video data and the authority of the audio-video retrieval platform;

the network and data security situation awareness platform is configured to issue a platform authority corresponding to the level of the audio-video data to the security sharing gateway according to the alarm information sent by the security sharing gateway, and in a case where it is determined that the level of the audio-video data does not match the authority of the audio-video retrieval platform, dynamically adjust a security protection strategy of at least one other gateway in the dynamic orchestration-based audio-video security protection system; wherein security of the adjusted security protection strategy is higher than security of the security protection strategy before adjustment.

In some embodiments, the security sharing gateway is further configured to, in response to determining that the authority of the audio-video retrieval platform matches the level of the audio-video data in the audio-video code stream, perform application-layer protocol parsing on the audio-video code stream to determine whether a hash-based message authentication code (HMAC) value exists in the audio-video code stream;

in a case where there is no HMAC value in the audio-video code stream, add an encoding-layer watermark on the audio-video data in the audio-video code stream, generate a first HMAC value according to a randomly generated first key and the encoding-layer watermark, and encapsulate the first HMAC value and a cipher text of the first key into a security parameter struct; where the cipher text of the first key is obtained by encrypting the first key according to a first protection key, and the protection key is obtained by a request according to a first unique identification;

in a case where there is an HMAC value in the audio-video code stream, acquire a second HMAC value and a cipher text of a second key in the security parameter struct, request the first protection key according to the first unique identification, obtain the second key by decrypting the cipher text of the second key using the first protection key, and generate a third HMAC value according to the encoding-layer watermark of the audio-video data and the second key;

in a case where the third HMAC value is inconsistent with the second HMAC value, intercept the audio-video code stream and report alarm information to the network and data security situation awareness platform; or in a case where the third HMAC value is consistent with the second HMAC value, add an encoding-layer watermark on the audio-video data in the audio-video code stream, and generate a fourth HMAC value according to a randomly generated third key, the encoding-layer watermark added by the present node, and the second HMAC value, and encapsulate the fourth HMAC value and a cipher text of the third key into the security parameter struct; where the cipher text of the third key is obtained by encrypting the third key according to a second protection key, and the second protection key is obtained by a request according to a second unique identification.

In some embodiments, the dynamic orchestration-based audio-video security protection system further comprises a security access gateway; where the security access gateway is configured to, for an audio-video code stream output by an audio-video source, perform application-layer protocol parsing on the audio-video code stream, and perform encryption and integrity protection processing on audio-video data in the audio-video code stream;

replace the audio-video data before the processing with the processed audio-video data, and re-encapsulate the processed audio-video data into an audio-video code stream.

In some embodiments, the dynamic orchestration-based audio-video security protection system further comprises a security storage gateway; wherein the security storage gateway is configured to, for an audio-video code stream to be stored, in a case where the audio-video code stream is to be stored in a cloud storage, perform encryption and integrity protection processing on an audio-video file corresponding to the audio-video code stream using a security protection plug-in in an operating system kernel of a storage node where the audio-video code stream is to be stored; where the security protection plug-in acts between a virtual file system and an underlying file system for performing encryption and integrity protection processing on stored audio-video files;

where the security protection plug-in is further configured to perform decryption and integrity verification processing on a retrieved audio-video code stream;

and/or, for an audio-video code stream to be stored, in a case where the audio-video code stream is to be stored in a video recorder device, perform application-layer protocol parsing on the audio-video code stream, perform encryption and integrity protection processing on audio-video data in the audio-video code stream, replace the audio-video data before the processing with the processed audio-video data, re-encapsulate the processed audio-video data into an audio-video code stream, and store the audio-video code stream in the video recorder device.

In some embodiments, the security storage gateway is further configured to, for an audio-video code stream to be retrieved, in response to determining that an authority of an audio-video retrieval party does not match a level of audio-video data in the audio-video code stream, intercept the audio-video code stream and report alarm information to the network and data security situation awareness platform, so that the network and data security situation awareness platform dynamically adjusts a security protection strategy of at least one gateway in the dynamic orchestration-based audio-video security protection system according to the alarm information; where the security protection strategy of the security storage gateway includes a data flow authority control strategy, and the data flow authority control strategy includes a corresponding relationship between a level of audio-video data and an authority of an audio-video retrieval party.

In some embodiments, the network and data security situation awareness platform is further configured to receive alarm information; where the alarm information comprises a level of audio-video data and an authority of an audio-video retrieval platform;

in a case where the network and data security situation awareness platform determines that the level of the audio-video data does not match the authority of the audio-video retrieval platform, dynamically adjust a security protection strategy of at least one other gateway in the dynamic orchestration-based audio-video security protection system; where security of the adjusted security protection strategy is higher than security of the security protection strategy before the adjustment;

where the security protection strategy adjustment includes one or more of:

encoding-layer encryption strategy adjustment; where the encoding-layer encryption strategy adjustment includes one or more of key update period adjustment, algorithm strength adjustment and key strength adjustment;

data flow authority control strategy adjustment; where the data flow authority control strategy adjustment includes adjusting a corresponding relationship between an audio-video data level and a platform authority, and/or adjusting a corresponding relationship between a level of audio-video data and an authority of an audio-video retrieval party;

sensitive data desensitization strategy adjustment; where the sensitive data desensitization strategy is used for instructing to desensitize specified audio-video data in the audio-video data; and the sensitive data desensitization strategy adjustment comprises adjustment of a specified audio-video data type and/or adjustment of a specified audio-video data proportion;

encoding-layer watermark strategy adjustment; where the encoding-layer watermark strategy adjustment includes one or more of adjustment of information contained in an encoded watermark, watermark superimposition frequency adjustment and watermark verification frequency adjustment.

In some embodiments, the dynamically adjusting a security protection strategy of at least one other gateway in the dynamic orchestration-based audio-video security protection system includes:

for the security sharing gateway, performing one or more of encoding-layer encryption strategy adjustment, data flow authority control strategy adjustment, sensitive data desensitization strategy adjustment, and encoding-layer watermark strategy adjustment;

where the encoding-layer encryption strategy adjustment includes one or more of shortening a key update period, improving algorithm strength, and improving key strength;

the data flow authority control strategy adjustment includes adding a platform authority corresponding to a new level of audio-video data;

the sensitive data desensitization strategy adjustment includes increasing a proportion of specified audio-video data in audio-video data and/or extending a type of the specified audio-video data;

the encoding-layer watermark strategy adjustment comprises one or more of increasing information contained in an encoded watermark, increasing a watermark superimposition frequency and increasing a watermark verification frequency;

and/or, for a security access gateway, performing encoding-layer encryption strategy adjustment;

where the encoding-layer encryption strategy adjustment includes one or more of shortening a key update period, improving algorithm strength, and improving key strength;

and/or, for a security storage gateway, performing encoding-layer encryption strategy adjustment and/or data flow authority strategy update;

where the encoding-layer encryption strategy adjustment includes one or more of shortening a key update period, improving algorithm strength, and improving key strength;

the data flow authority control strategy adjustment includes adding an authority of an audio-video retrieval party corresponding to a new level of audio-video data;

and/or, for a security display gateway, performing encoding-layer watermark strategy adjustment;

where the security display gateway is configured to add an encoding-layer watermark on audio-video data to be displayed;

the encoding-layer watermark strategy adjustment includes one or more of increasing information contained in an encoded watermark, increasing a watermark superimposition frequency and increasing a watermark verification frequency;

It is noted that relational terms such as first and second, and the like, may be used herein to distinguish one entity or action from another entity or action without necessarily requiring or implying any actual such relationship or order between such entities or actions. Further, the terms "include", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by the phrase "includes a . . . " does not, without more constraints, preclude the existence of additional identical elements in the process, method, article, or apparatus that includes the element.

While the present application has been described referring to the preferred embodiments, it is to be understood that the present application is not limited to the disclosed embodiments, but it is intended to cover various modifications, equivalents, and alternatives falling within the spirit and scope of the present application.

What is claimed is:

1. A dynamic orchestration-based audio-video security protection method, being executed in a dynamic orchestration-based audio-video security protection system that comprises a security sharing gateway and a network and data security situation awareness platform, the method comprises:

identifying, by the security sharing gateway, a level of audio-video data in an audio-video code stream and an authority of an audio-video retrieval platform before forwarding the audio-video code stream to the audio-video retrieval platform;

in a case where the security sharing gateway retrieves no platform authority corresponding to the level of the audio-video data, reporting, by the security sharing gateway, alarm information to the network and data security situation awareness platform, wherein the alarm information comprises the level of the audio-video data and the authority of the audio-video retrieval platform, in response to receiving the alarm information, the network and data security situation awareness platform issues a platform authority corresponding to the level of the audio-video data to the security sharing gateway according to the alarm information, and in response to determining that the level of the audio-video data does not match the authority of the audio-video retrieval platform, the network and data security situation awareness platform dynamically adjusts a security protection strategy of at least one other gateway in the dynamic orchestration-based audio-video security protection system, wherein security of the adjusted security protection strategy is higher than security of the security protection strategy before adjustment; and in a case where the security sharing gateway determines that the authority of the audio-video retrieval platform matches the level of the audio-video data in the audio-video code stream, performing, by the security sharing gateway, application-layer protocol parsing on the audio-video code stream to determine whether a hash-based message authentication code (HMAC) value exists in the audio-video code stream;

in response to determining that the HMAC value does not exist in the audio-video code stream, adding, by the security sharing gateway, an encoding-layer watermark on the audio-video data in the audio-video code stream, generating, by the security sharing gateway, a first HMAC value according to a randomly generated first key and the encoding-layer watermark, and encapsulating, by the security sharing gateway, the first HMAC value and a cipher text of the first key into a security parameter struct of the audio-video code stream, wherein the cipher text of the first key is obtained by encrypting the first key according to a first protection key, and the protection key is obtained by a request according to a first unique identification;

in response to determining that the HMAC value exists in the audio-video code stream,
acquiring, by the security sharing gateway, a second HMAC value and a cipher text of a second key in the security parameter struct of the audio-video code stream,
requesting, by the security sharing gateway, the first protection key according to the first unique identification,
obtaining, by the security sharing gateway, the second key by decrypting the cipher text of the second key using the first protection key, and
generating, by the security sharing gateway, a third HMAC value according to the encoding-layer watermark of the audio-video data and the second key;

intercepting, by the security sharing gateway, the audio-video code stream in response to determining that the third HMAC value is inconsistent with the second HMAC value; and in response to determining that the third HMAC value is consistent with the second HMAC value, adding, by the security sharing gateway, an encoding-layer watermark on the audio-video data in the audio-video code stream, and generating a fourth HMAC value according to a randomly generated third key, the encoding-layer watermark added by a present node, and the second HMAC value, and encapsulating the fourth HMAC value and a cipher text of the third key into the security parameter struct of the audio-video code stream, wherein the cipher text of the third key is obtained by encrypting the third key according to a second protection key, and the second protection key is obtained by a request according to a second unique identification.

2. The dynamic orchestration-based audio-video security protection method according to claim 1, wherein the dynamic orchestration-based audio-video security protection system further comprises a security access gateway, and the method further comprises:
for the audio-video code stream output by an audio-video source, performing, by the security access gateway, application-layer protocol parsing on the audio-video code stream, and performing encryption and integrity protection processing on the audio-video data in the audio-video code stream;
replacing, by the security access gateway, the audio-video data before the processing with the processed audio-video data, and re-encapsulating the processed audio-video data into the audio-video code stream.

3. The dynamic orchestration-based audio-video security protection method according to claim 1, wherein the dynamic orchestration-based audio-video security protection system further comprises a security storage gateway, and the method further comprises:
for the audio-video code stream to be stored, in a case where the audio-video code stream is to be stored in a cloud storage, performing, by the security storage gateway, encryption and integrity protection processing on an audio-video file corresponding to the audio-video code stream using a security protection plug-in in an operating system kernel of a storage node where the audio-video code stream is to be stored, wherein the security protection plug-in acts between a virtual file system and an underlying file system for performing encryption and integrity protection processing on stored audio-video files, and wherein the security protection plug-in is further configured to perform decryption and integrity verification processing on a retrieved audio-video code stream; and/or for the audio-video code stream to be stored, in a case where the audio-video code stream is to be stored in a video recorder device, performing, by the security storage gateway, application-layer protocol parsing on the audio-video code stream, performing encryption and integrity protection processing on the audio-video data in the audio-video code stream, replacing the audio-video data before the processing with the processed audio-video data, re-encapsulating the processed audio-video data into the audio-video code stream, and storing the audio-video code stream in the video recorder device.

4. The dynamic orchestration-based audio-video security protection method according to claim 3, wherein the method further comprises:
for the audio-video code stream to be retrieved, intercepting, by the security storage gateway, the audio-video code stream in a case where it is determined that an authority of an audio-video retrieval party does not match the level of audio-video data in the audio-video code stream.

5. The dynamic orchestration-based audio-video security protection method according to claim 1, wherein the method further comprises:
wherein the security protection strategy adjustment comprises one or more of:
encoding-layer encryption strategy adjustment; wherein the encoding-layer encryption strategy adjustment comprises one or more of key update period adjustment, algorithm strength adjustment and key strength adjustment;
data flow authority control strategy adjustment; wherein the data flow authority control strategy adjustment comprises adjusting a corresponding relationship between a level of the audio-video data and a platform authority, and/or adjusting a corresponding relationship between a level of the audio-video data and an authority of an audio-video retrieval party;
sensitive data desensitization strategy adjustment; wherein the sensitive data desensitization strategy is used for instructing to desensitize specified audio-video data in the audio-video data; and
encoding-layer watermark strategy adjustment; wherein the encoding-layer watermark strategy adjustment comprises one or more of adjustment of information contained in an encoded watermark, watermark superimposition frequency adjustment and watermark verification frequency adjustment.

6. The dynamic orchestration-based audio-video security protection method according to claim 1, wherein the dynamically adjusting of the security protection strategy of the at least one other gateway in the dynamic orchestration-based audio-video security protection system comprises:
for the security sharing gateway, performing one or more of encoding-layer encryption strategy adjustment, data flow authority control strategy adjustment, sensitive data desensitization strategy adjustment, and encoding-layer watermark strategy adjustment;

wherein:
the encoding-layer encryption strategy adjustment comprises one or more of shortening a key update period, improving algorithm strength, and improving key strength;
the data flow authority control strategy adjustment comprises adding a platform authority corresponding to a new level of audio-video data;
the sensitive data desensitization strategy adjustment comprises increasing a proportion of specified audio-video data in audio-video data and/or extending a type of the specified audio-video data;
the encoding-layer watermark strategy adjustment comprises one or more of increasing information contained in an encoded watermark, increasing a watermark superimposition frequency and increasing a watermark verification frequency; and/or
for a security access gateway, performing encoding-layer encryption strategy adjustment, wherein the encoding-layer encryption strategy adjustment comprises one or more of shortening a key update period, improving algorithm strength, and improving key strength; and/or
for a security storage gateway, performing encoding-layer encryption strategy adjustment and/or data flow authority strategy update, wherein
the encoding-layer encryption strategy adjustment comprises one or more of shortening a key update period, improving algorithm strength, and improving key strength;
the data flow authority control strategy adjustment comprises adding an authority of an audio-video retrieval party corresponding to a new level of audio-video data; and/or
for a security display gateway, performing encoding-layer watermark strategy adjustment, wherein
the security display gateway is configured to add an encoding-layer watermark on the audio-video data to be displayed;
the encoding-layer watermark strategy adjustment comprises one or more of increasing information contained in an encoded watermark, increasing a watermark superimposition frequency and increasing a watermark verification frequency.

7. An electronic device comprising:
a processor; and
a memory configured to store a computer program, wherein the processor is configured to, when executing the computer program stored in the memory, perform following operations comprising:
identifying a level of audio-video data in an audio-video code stream and an authority of an audio-video retrieval platform before forwarding the audio-video code stream to an audio-video retrieval platform;
reporting, to a network and data security situation awareness platform, alarm information in a case where the security sharing gateway retrieves no platform authority corresponding to the level of the audio-video data, wherein the alarm information comprises the level of the audio-video data and the authority of the audio-video retrieval platform;
receiving, in response to the alarm information and from the network and data security situation awareness platform, a platform authority corresponding to the level of the audio-video data issued by the network and data security situation awareness platform, and in response to determining that the level of the audio-video data does not match the authority of the audio-video retrieval platform, the network and data security situation awareness platform dynamically adjusts a security protection strategy of at least one other gateway in a dynamic orchestration-based audio-video security protection system, wherein security of the adjusted security protection strategy is higher than security of the security protection strategy before adjustment; and
performing, in response to determining that the authority of the audio-video retrieval platform matches the level of the audio-video data in the audio-video code stream, an application-layer protocol parsing on the audio-video code stream to determine whether a hash-based message authentication code (HMAC) value exists in the audio-video code stream;
in response to determining that the HMAC value does not exist in the audio-video code stream, adding an encoding-layer watermark on the audio-video data in the audio-video code stream, generating a first HMAC value according to a randomly generated first key and the encoding-layer watermark, and encapsulating the first HMAC value and a cipher text of the first key into a security parameter struct of the audio-video code stream, wherein the cipher text of the first key is obtained by encrypting the first key according to a first protection key, and the protection key is obtained by a request according to a first unique identification;
in response to determining that the HMAC value exists in the audio-video code stream, acquiring a second HMAC value and a cipher text of a second key in the security parameter struct of the audio-video code stream, requesting the first protection key according to the first unique identification, obtaining the second key by decrypting the cipher text of the second key using the first protection key, and generating a third HMAC value according to the encoding-layer watermark of the audio-video data and the second key;
intercepting the audio-video code stream in response to determining that the third HMAC value is inconsistent with the second HMAC value; and
in response to determining that the third HMAC value is consistent with the second HMAC value, adding an encoding-layer watermark on the audio-video data in the audio-video code stream, and generating a fourth HMAC value according to a randomly generated third key, the encoding-layer watermark added by a present node, and the second HMAC value, and encapsulating the fourth HMAC value and a cipher text of the third key into the security parameter struct of the audio-video code stream, wherein the cipher text of the third key is obtained by encrypting the third key according to a second protection key, and the second protection key is obtained by a request according to a second unique identification.

8. A dynamic orchestration-based audio-video security protection system, comprises:
a network and data security situation awareness platform and a security sharing gateway, wherein the security sharing gateway, being implemented by a hardware processor, is configured to:
identify a level of audio-video data in an audio-video code stream and an authority of an audio-video retrieval platform before forwarding the audio-video code stream to the audio-video retrieval platform;

report, to the network and data security situation awareness platform, alarm information in a case where the security sharing gateway retrieves no platform authority corresponding to the level of the audio-video data, wherein the alarm information comprises the level of the audio-video data and the authority of the audio-video retrieval platform;

receive, in response to the alarm information and from the network and data security situation awareness platform, a platform authority corresponding to the level of the audio-video data issued by the network and data security situation awareness platform, wherein in response to determining that the level of the audio-video data does not match the authority of the audio-video retrieval platform, the network and data security situation awareness platform dynamically adjusts a security protection strategy of at least one other gateway in the dynamic orchestration-based audio-video security protection system, and wherein security of the adjusted security protection strategy is higher than security of the security protection strategy before adjustment;

perform, in response to determining that the authority of the audio-video retrieval platform matches the level of the audio-video data in the audio-video code stream, an application-layer protocol parsing on the audio-video code stream to determine whether a hash-based message authentication code (HMAC) value exists in the audio-video code stream;

in response to determining that the HMAC value does not exist in the audio-video code stream, add an encoding-layer watermark on the audio-video data in the audio-video code stream, generate a first HMAC value according to a randomly generated first key and the encoding-layer watermark, and encapsulate the first HMAC value and a cipher text of the first key into a security parameter struct of the audio-video code stream, wherein the cipher text of the first key is obtained by encrypting the first key according to a first protection key, and the protection key is obtained by a request according to a first unique identification;

in response to determining that the HMAC value exists in the audio-video code stream, acquire a second HMAC value and a cipher text of a second key in the security parameter struct of the audio-video code stream, request the first protection key according to the first unique identification, obtain the second key by decrypting the cipher text of the second key using the first protection key, and generate a third HMAC value according to the encoding-layer watermark of the audio-video data and the second key;

intercept the audio-video code stream in response to determining that the third HMAC value is inconsistent with the second HMAC value; and in response to determining that the third HMAC value is consistent with the second HMAC value, add an encoding-layer watermark on the audio-video data in the audio-video code stream, and generate a fourth HMAC value according to a randomly generated third key, the encoding-layer watermark added by a present node, and the second HMAC value, and encapsulate the fourth HMAC value and a cipher text of the third key into the security parameter struct of the audio-video code stream, wherein the cipher text of the third key is obtained by encrypting the third key according to a second protection key, and the second protection key is obtained by a request according to a second unique identification.

9. The dynamic orchestration-based audio-video security protection system according to claim 8, wherein the dynamic orchestration-based audio-video security protection system further comprises a security access gateway, and wherein the security access gateway, being implemented by a processor, is configured to:

for the audio-video code stream output by an audio-video source, perform application-layer protocol parsing on the audio-video code stream, and perform encryption and integrity protection processing on the audio-video data in the audio-video code stream; and replace the audio-video data before the processing with the processed audio-video data, and re-encapsulate the processed audio-video data into the audio-video code stream.

10. The dynamic orchestration-based audio-video security protection system according to claim 8, wherein the dynamic orchestration-based audio-video security protection system further comprises a security storage gateway, wherein the security storage gateway, being implemented by a processor, is configured to:

for the audio-video code stream to be stored, in a case where the audio-video code stream is to be stored in a cloud storage, perform encryption and integrity protection processing on an audio-video file corresponding to the audio-video code stream using a security protection plug-in in an operating system kernel of a storage node where the audio-video code stream is to be stored, wherein the security protection plug-in acts between a virtual file system and an underlying file system for performing encryption and integrity protection processing on stored audio-video file, and wherein decryption and integrity verification processing on a retrieved audio-video code stream can further be performed by using the security protection plug-in; and/or for the audio-video code stream to be stored, in a case where the audio-video code stream is to be stored in a video recorder device, perform application-layer protocol parsing on the audio-video code stream, perform encryption and integrity protection processing on the audio-video data in the audio-video code stream, replace the audio-video data before the processing with the processed audio-video data, re-encapsulate the processed audio-video data into the audio-video code stream, and store the audio-video code stream in the video recorder device.

11. The dynamic orchestration-based audio-video security protection system according to claim 10, wherein the security storage gateway, being implemented by the processor, is further configured to:

for the audio-video code stream to be retrieved, in response to determining that an authority of an audio-video retrieval party does not match a level of the audio-video data in the audio-video code stream, intercept the audio-video code stream and report the alarm information to the network and data security situation awareness platform, wherein the security protection strategy of the security storage gateway comprises a data flow authority control strategy, and the data flow authority control strategy comprises a corresponding relationship between a level of the audio-video data and an authority of an audio-video retrieval party.

12. The dynamic orchestration-based audio-video security protection system according to claim 8, wherein the security protection strategy adjustment comprises one or more of:
encoding-layer encryption strategy adjustment, wherein the encoding-layer encryption strategy adjustment comprises one or more of key update period adjustment, algorithm strength adjustment and key strength adjustment;
data flow authority control strategy adjustment, wherein the data flow authority control strategy adjustment comprises adjusting a corresponding relationship between a level of the audio-video data and a platform authority, and/or adjusting a corresponding relationship between a level of the audio-video data and an authority of an audio-video retrieval party;
sensitive data desensitization strategy adjustment, wherein the sensitive data desensitization strategy is used for instructing to desensitize specified audio-video data in the audio-video data; and the sensitive data desensitization strategy adjustment comprises adjustment of a specified audio-video data type and/or adjustment of a specified audio-video data proportion; and
encoding-layer watermark strategy adjustment, wherein the encoding-layer watermark strategy adjustment comprises one or more of adjustment of information contained in an encoded watermark, watermark superimposition frequency adjustment and watermark verification frequency adjustment.

13. The dynamic orchestration-based audio-video security protection system according to claim 8, wherein the dynamically adjusting of the security protection strategy of at least one other gateway in the dynamic orchestration-based audio-video security protection system comprises:
for the security sharing gateway, performing one or more of encoding-layer encryption strategy adjustment, data flow authority control strategy adjustment, sensitive data desensitization strategy adjustment, and encoding-layer watermark strategy adjustment;
wherein:
the encoding-layer encryption strategy adjustment comprises one or more of shortening a key update period, improving algorithm strength, and improving key strength;
the data flow authority control strategy adjustment comprises adding a platform authority corresponding to a new level of the audio-video data;
the sensitive data desensitization strategy adjustment comprises increasing a proportion of specified audio-video data in audio-video data and/or extending a type of the specified audio-video data;
the encoding-layer watermark strategy adjustment comprises one or more of increasing information contained in an encoded watermark, increasing a watermark superimposition frequency and increasing a watermark verification frequency; and/or
for a security access gateway being implemented by a processor, performing encoding-layer encryption strategy adjustment wherein the encoding-layer encryption strategy adjustment comprises one or more of shortening a key update period, improving algorithm strength, and improving key strength; and/or
for a security storage gateway being implemented by the processor, performing encoding-layer encryption strategy adjustment and/or data flow authority strategy update, wherein:
the encoding-layer encryption strategy adjustment comprises one or more of shortening a key update period, improving algorithm strength, and improving key strength; and
the data flow authority control strategy adjustment comprises adding an authority of an audio-video retrieval party corresponding to a new level of the audio-video data; and/or
for a security display gateway being implemented by the processor, performing encoding-layer watermark strategy adjustment, wherein:
the security display gateway is configured to add an encoding-layer watermark on the audio-video data to be displayed; and
the encoding-layer watermark strategy adjustment comprises one or more of increasing information contained in an encoded watermark, increasing a watermark superimposition frequency and increasing a watermark verification frequency.

* * * * *